United States Patent [19]
Bagnas

[11] Patent Number: 5,805,163
[45] Date of Patent: Sep. 8, 1998

[54] DARKENED TRANSPARENT WINDOW OVERLAPPING AN OPAQUE WINDOW

[75] Inventor: Emmanuel Salud Bagnas, San Diego, Calif.

[73] Assignee: NCR Corporation, Dayton, Ohio

[21] Appl. No.: 635,989

[22] Filed: Apr. 22, 1996

[51] Int. Cl.[6] ........................................................ G06F 3/00
[52] U.S. Cl. .............................................................. 345/345
[58] Field of Search ..................... 395/326–358; 345/117–120, 326–358, 145–146

[56] References Cited

U.S. PATENT DOCUMENTS

| 4,868,765 | 9/1989 | Diefendorff | 345/340 |
| 5,283,560 | 2/1994 | Bartlett | 345/146 X |
| 5,303,388 | 4/1994 | Kreitman et al. | 395/355 |
| 5,463,728 | 10/1995 | Blahut et al. | 395/344 |
| 5,475,812 | 12/1995 | Corona et al. | 395/344 |
| 5,530,795 | 6/1996 | Wan | 395/329 |
| 5,617,114 | 4/1997 | Bier et al. | 346/146 X |
| 5,651,107 | 7/1997 | Frank et al. | 395/344 |

OTHER PUBLICATIONS

Bier et al., "Toolglass and Magic Lenses: The See–Through Interface", ACM, pp. 73–80, 1993.
Bier et al., "A Taxonomy of See–Through Tools", ACM, pp. 358–364, Apr. 1994.
Foley et al., "Computer Graphics: Principles and Practice", Addison–Wesley, pp. 754–758, Nov. 1993.
GUI, "Graphic User Interface", Research Disclosure, Mar. 1993, pp. 1–2 (Anonymous).

Primary Examiner—John E. Breene
Attorney, Agent, or Firm—Merchant, Gould, Smith, Edell, Welter & Schmidt

[57] ABSTRACT

A method, apparatus and article of manufacture for graphically displaying information in a transparent window on a display attached to a computer without obscuring the information already graphically displayed in the transparent windows is disclosed. In a first embodiment, information is graphically displayed in a first window on a display, and is viewable through a transparent second window also displayed. In a second embodiment, information is displayed in a transparent window on a display, so as not to obscure the information already graphically displayed. In a third embodiment, each window can be configured as transparent or opaque.

15 Claims, 6 Drawing Sheets

DARKENED TRANSPARENT WINDOW OVERLAPPING AN OPAQUE WINDOW

BACKGROUND OF THE INVENTION

1. Field of the Invention

This invention relates in general to a graphical user interface for computer systems, and more particularly, to a method, apparatus and article of manufacture for graphically displaying information in a transparent window on a display attached to a computer without obscuring the information already graphically displayed thereon.

2. Description of Related Art

Current windowing systems are opaque in that only the selected or active window is visible, leaving the other windows partially or completely obscured by the active window. This obscuring of windows leads to several problems for novice users. One problem is that windows other than the active window can partially or completely vanish from sight of the user, and thus may appear to be lost. Another problem is that critical information appearing in or critical applications running in the unselected windows are not viewable, requiring constant moving and resizing of windows in order to be seen.

These problems are especially apparent in two situations. First, in many graphical user interfaces, such as Microsoft WINDOWS™ 3.1, windows in which applications are running can be "iconified," that is, such windows can be reduced or minimized to icons representing the windows. These icons are typically placed along one edge of the display, usually the bottom or right, although potentially they can be placed anywhere on the screen. Windows that obscure these icons must be moved or resized before the icons are viewable, and therefore accessible, in order to enlarge or maximize them to the windows they represent.

Second, many application windows are configured to remain atop all the other windows regardless of whether they are the selected window. Applications having such windows tend be accessed frequently, such as toolbars, which commonly provide a shortcut to launching other applications, or status windows, which provide status information that is referenced often. Examples of status windows include resource monitors that display central-processing-unit (CPU) or network utilization, available memory or disk space, etc., as well as clocks, date books, and calendars. These "stay on top" windows often obscure information beneath them, requiring them to be moved or iconified in order to access the obscured information.

One solution to these problems is to provide for translucent windows, as disclosed in co-pending and commonly-assigned patent application Ser. No. 08/386,033, filed Feb. 9, 1995, by C. Isenman, and entitled METHOD AND APPARATUS FOR DISPLAYING TRANSLUCENT OVERLAPPING GRAPHICAL OBJECTS ON A COMPUTER MONITOR, which is incorporated by reference herein. However, this solution has a serious drawback. Translucent windows are not transparent, and although allow access to the information previously obscured, the information is not clearly viewable. In fact, the vestigial representation of the obscured information may be so poor as to be incomprehensible, even if viewable. With the advent of high-resolution color monitors, such as VGA and S-VGA monitors, which are capable of precisely showing literally millions of different colors on the screen at one time, this solution merely remedies the problem but does not completely eliminate it.

Thus, it can be seen that there is a need for a transparent window and controls in window environments.

SUMMARY OF THE INVENTION

To overcome the limitations in the prior art described above, and to overcome other limitations that will become apparent upon reading and understanding the present specification, the present invention discloses a method, apparatus and article of manufacture for graphically displaying information in a transparent window on a display attached to a computer without obscuring the information already graphically displayed thereon.

In a first embodiment of the present invention, information is graphically displayed in a first window on a display. Information is then graphically displayed in a second window that at least partially overlaps the first window. However, the second window is transparent to allow the first window to be viewed through the second window.

In a second embodiment of the present invention, information is displayed in a transparent window, so as not to obscure the information already graphically displayed on the display. The transparent window comprises a grid of pixels, and overlaps a corresponding grid of pixels of the display. After this corresponding grid of pixels is determined, it is copied into a buffer. The copied grid in the buffer is then modified, and the corresponding grid is replaced by the copied grid. The present invention is not limited to any specific manner in which the copied grid is modified, although several such manners are discussed in detail in the specification.

In yet a third embodiment of the present invention, each window can be configured as transparent or opaque. Each window configured as transparent allows the other windows which it partially overlaps to be viewed through it. Although this embodiment is not necessarily so limited, the specification contemplates the reconfiguring as transparent those windows configured as opaque, and vice-versa, and also for automatically reconfiguring as opaque those windows configured as transparent but which do not at least partially overlap any other windows.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
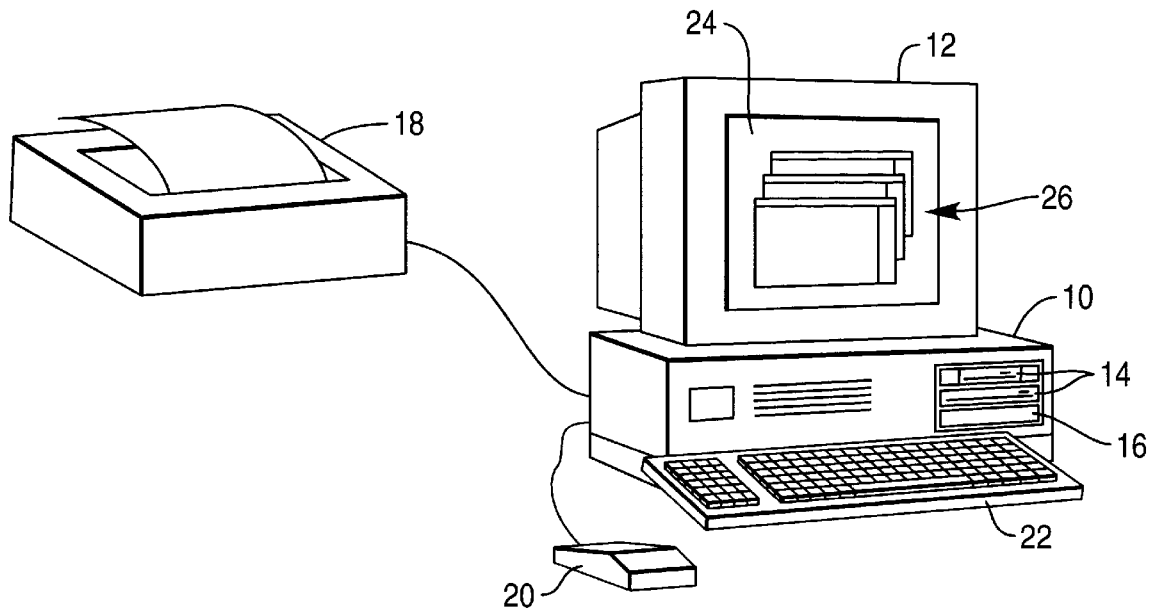
FIG. 1 illustrates a computer system implementing the transparent window and controls according the present invention.

FIG. 1 is a block diagram that illustrates an exemplary hardware environment of the present invention. The present invention is typically implemented using a personal computer 10 comprised of a CPU, random access memory, read-only memory, and/or other components. It is envisioned that attached to the personal computer 10 may be a monitor 12, hard and/or floppy disk drives 14, CD-ROM drives 16, and printer 18 peripherals. Also included in the preferred embodiment may be input devices, for example, a mouse pointing device 20 and a keyboard 22.

The personal computer 10 operates under the control of a operating system 24, which is represented in FIG. 1 by the screen display on the monitor 12. The present invention is preferably implemented using one or more computer programs 26, which are represented in FIG. 1 by the "windows" displayed on the monitor 12, operating under the control of the operating system 24. Alternatively, the present invention may be implemented in the operating system 24 itself.

Generally, the operating system 24 and the computer programs 26 are tangibly embodied in a computer-readable medium, e.g. one or more of the fixed and/or removable data storage devices 14 and 16. Both the operating system 24 and the computer programs 26 may be loaded from the data storage devices 14 and 16 into the memory of the computer 10. In addition, both the operating system 24 and the computer programs 26 comprise instructions which, when read and executed by the computer 10, causes the computer 10 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
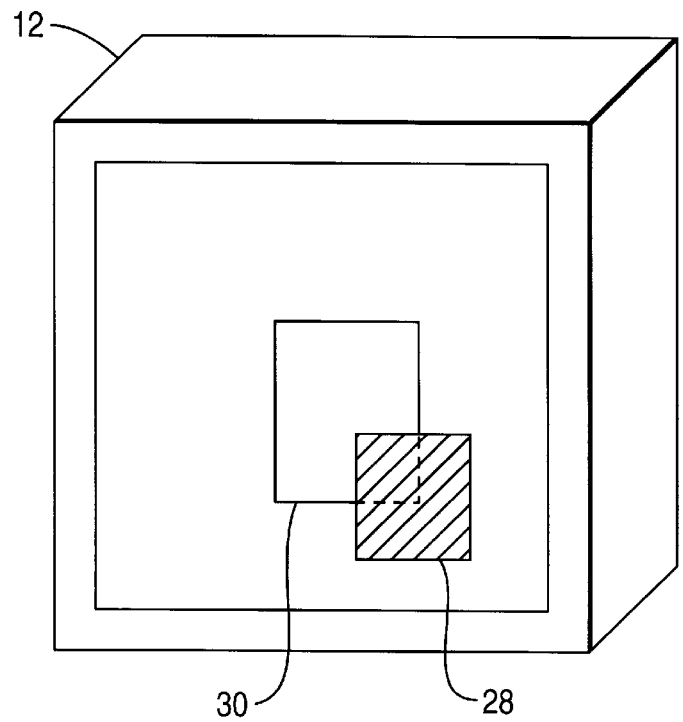
FIG. 2 illustrates a windowing graphical user interface display according to one embodiment of the present invention.

FIG. 2 is a block diagram that illustrates a windowing graphical user interface display according to one embodiment of the present invention. Windows 28 and 30 are displayed on the monitor 12 in a cascaded manner. Top level or selected window 28 is typically the active window in the system, although the lower level or unselected window 30 may be operating in the background. Window 28 is transparent, and thus allows window 30 to be viewed through window 28. So that the display of window 30 through window 28 is not confusing, window 28 may also be darkened as compared to the underlying screen components; however, the present invention is not limited to such transparent windows being darkened, as those skilled in the art can readily understand.

Figure 3:
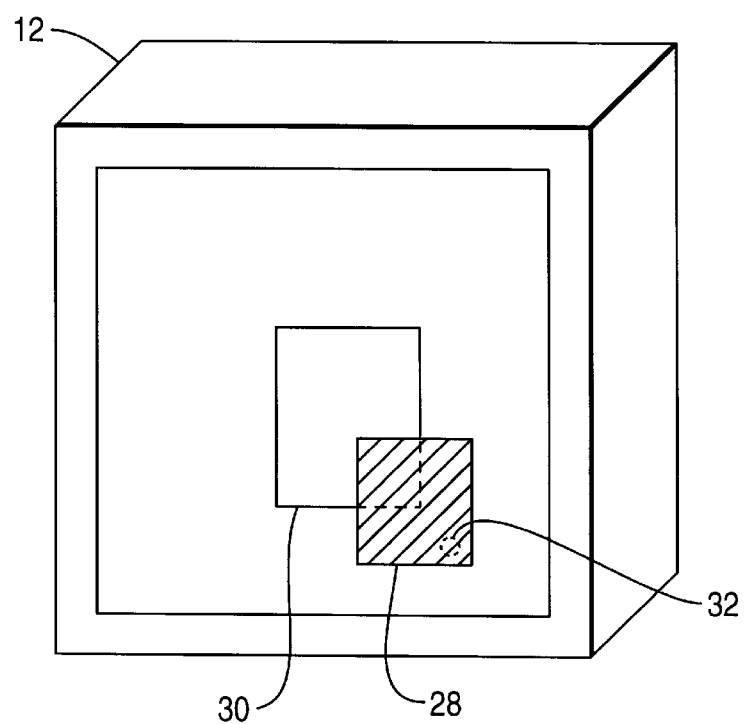
FIG. 3 illustrates a windowing graphical user interface display according to yet another embodiment of the present invention.

FIG. 3 illustrates a windowing graphical user interface display according of another embodiment of the present invention. Windows 28 and 30 are displayed on monitor 12 in a cascaded manner. Similar to the embodiment of FIG. 2, window 28 is transparent and thus allows window 30 to be viewed through window 28. As shown in FIG. 3, window 28 is also darkened as compared to window 30, although the present invention is not so limited.

The difference between the embodiment shown in FIG. 3 and that shown in FIG. 2 is the presence of object 32 in FIG. 3, which is overlapped by window 28 but still viewable because window 28 is transparent. In the embodiment of FIG. 2, only other windows are viewable through transparent windows; whereas in the embodiment of FIG. 3, everything on the monitor 12 is viewable through transparent window 28. Object 32 of FIG. 3 can be any of a number of graphical representations, including for example a task bar or a desktop icon as found in Microsoft WINDOWS™ 95 and iconified windows as found in Microsoft WINDOW™ 3.1.

Figure 4A:
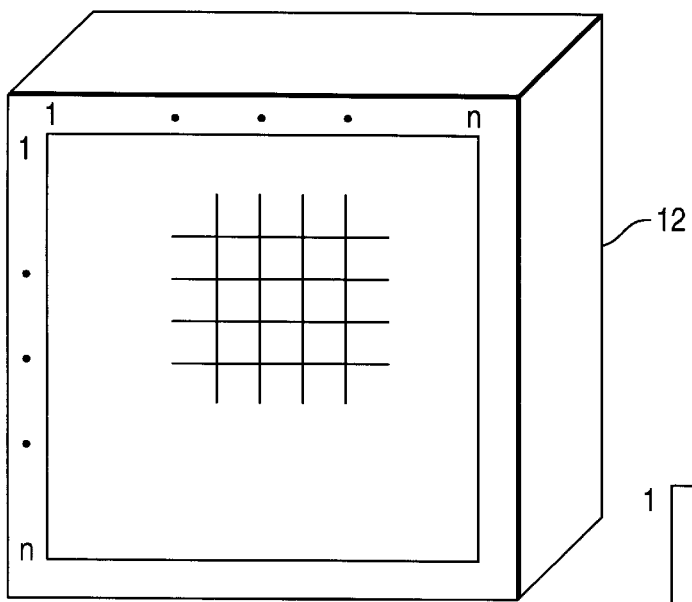
FIGS. 4A through 4D illustrate in more detail the window graphical user interface display according to the embodiment of the present invention shown in FIG. 3.

FIGS. 4A through 4D illustrate in more detail the window graphical user interface display according to the embodiment of the present invention shown in FIG. 3. Referring to FIG. 4A, as those in the art will readily understand, the monitor 12 is in actually comprised of a grid of pixels, or screen elements, ordered in m columns and n rows as shown. Each pixel can at least be turned on or off, signifying black or white, or, as in the preferred embodiment, can be any one of a large number of colors. In the preferred embodiment, each pixel has an associated RGB value, which those skilled in the art will understand to be that pixel's red-green-blue value. Typically, a higher RGB value for a given color means that the color is lighter, or in other words, lowering the RGB value of a pixel darkens its color without changing the color.

Figure 4B:
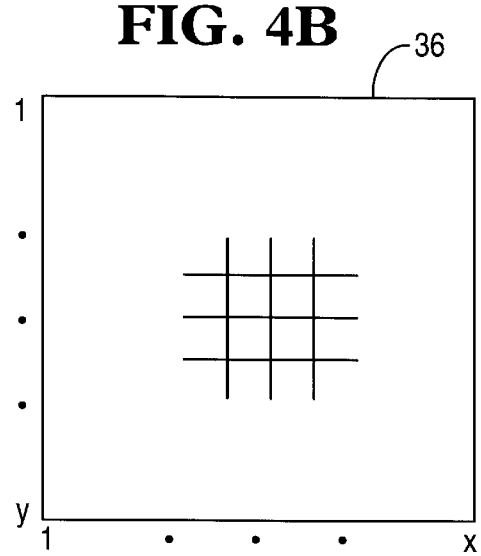

FIG. 4B is an illustration of grid of pixels 36 of window 28 of FIG. 3 by itself, without window 30 or object 32 showing through. As shown in FIG. 4B, grid 36 is organized into x rows and y columns, and thus there are a total of x times y pixels in grid 36.

Figure 4C:
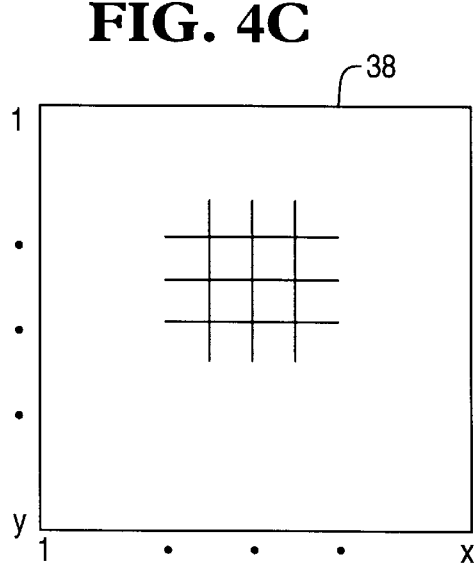

FIG. 4C is an illustration of grid of pixels 38 of monitor 12 of FIG. 3, which is underneath window 28 but that is viewable through window 28 because window 28 is transparent. As shown in FIG. 4C, grid 38 is also organized into x rows and y columns and also contains a total of x times y pixels, since it is the corresponding grid to grid 36.

Figure 4D:
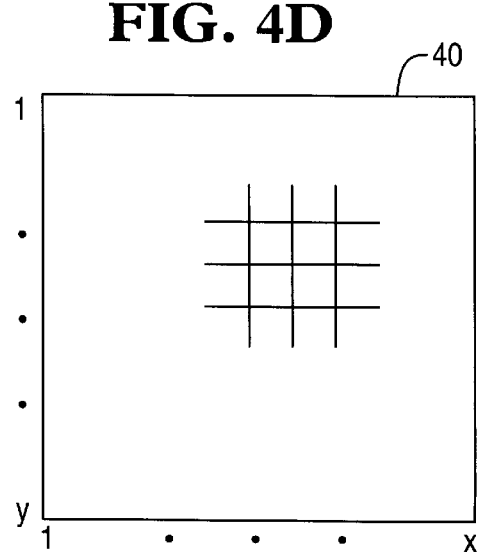

FIG. 4D is an illustration of grid of pixels 40 of window 28 of FIG. 3, with both window 30 and object 32 visible because window 28 is transparent. Grid 40 is again organized into x rows and y columns and contains a total of x times y pixels. As those skilled in the art can readily anticipate, grid 40 of FIG. 4D shows grid 38 of FIG. 4C as visible through grid 36 of FIG. 4B. It is grid 40 as shown in FIG. 4D that is ultimately displayed on the monitor 12 as shown in FIG. 3.

Figure 5:
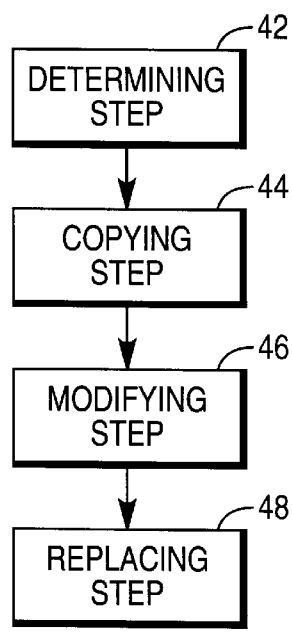
FIG. 5 is a flow chart defining the overall logic of the computer program which directs the operation of the present invention; and, FIGS. 6A through 6C illustrates yet another embodiment of the present invention.

FIG. 5 is a flow chart defining the overall logic of the computer program which directs the operation of the present invention. In block 42, the present invention determines the corresponding grid of pixels of the monitor 12 (grid 38 in FIG. 4C), overlapped by the grid of pixels of the transparent window (grid 36 in FIG. 4B). Next, in block 44, the present invention copies the corresponding grid of pixels (grid 38 in FIG. 4C) into a buffer. This buffer typically may reside in a memory of the computer 10.

Next, in block 46, the present invention modifies selected pixels in the buffer as compared to corresponding pixels in the transparent window (the pixels of grid 36 in FIG. 4B). For example, if the present invention modifies the pixel in row a (where a is less than or equal to x) and column b (where b is less than or equal to y), it will modify this pixel as compared to pixel in the transparent window which is also at row a and column b. Finally, in block 48, the present invention replaces the corresponding grid of pixels of the monitor 12 overlapped by the grid of pixels of the transparent window with the modified grid in the buffer (grid 40 in FIG. 4D). It is this modified grid in the buffer which is shown as window 28 in FIG. 3.

As those skilled in the art can readily appreciate, the way in which the present invention modifies selected pixels in the buffer as compared to corresponding pixels in the transparent window in block 46 (shown in FIG. 6) will determine the way in which window 30 and object 32 will be viewed through transparent window 28 on monitor 12 in FIG. 3. The present invention is not limited to any particular way in which these selected pixels in the buffer are modified. The following ways in which selected pixels are modified are described for illustrative purposes only, and should not be interpreted as limiting the scope of the present invention.

One method to modify selected pixels in block 46 is to darken each pixel in the buffer having a corresponding white pixel in the transparent window, and modify the color of each colored pixel in the buffer having a corresponding colored pixel in the transparent window; white pixels in the buffer which have a corresponding colored pixel in the transparent window remain unmodified. Thus, for example, if a pixel in the buffer is blue and the corresponding pixel is white, the pixel in the buffer will be darkened to dark blue. One method to darken such a pixel is to lower the pixel's RGB value, which keeps its color the same but which lowers its brightness.

Furthermore, one method in which to modify the color of each colored pixel in the buffer having a corresponding colored pixel in the transparent window is to combine the colors if both are primary. In this way, a yellow pixel in the buffer having a corresponding green pixel in the transparent window would be changed to blue, because yellow plus green equals blue.

A further method which to modify the color of a colored pixel in the buffer having a corresponding colored pixel in the transparent window is to dither the pixels in the buffer surrounding the colored pixel. Dithering is a technique used in computer graphics to create additional colors and shades from an existing palette by interspersing pixels of different colors. On a monochrome display, areas of gray may be created by varying the proportion of black and white pixels. In color displays, colors and textures may be created by varying the proportions of existing colors. The different colors can either be distributed randomly or regularly. The higher the resolution of the display, the smoother the dithered color will appear to the eye. Dithering is also used to create patterns for use as backgrounds, fills and shading, as well as for creating halftones for printing. Dithering may further be used in anti-aliasing in order to make jagged lines appear smoother on screen.

Figure 6A:
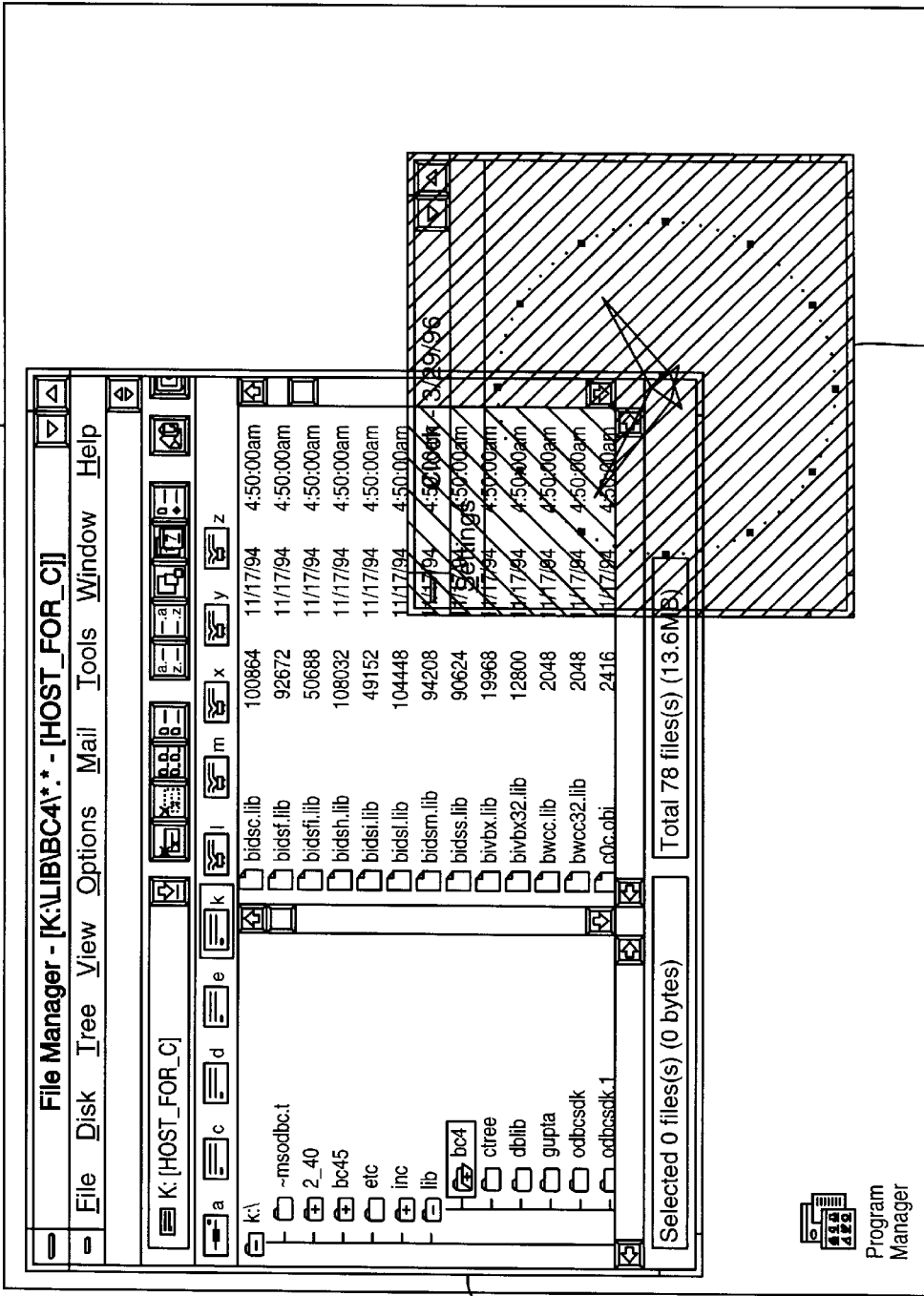
Figure 6B:
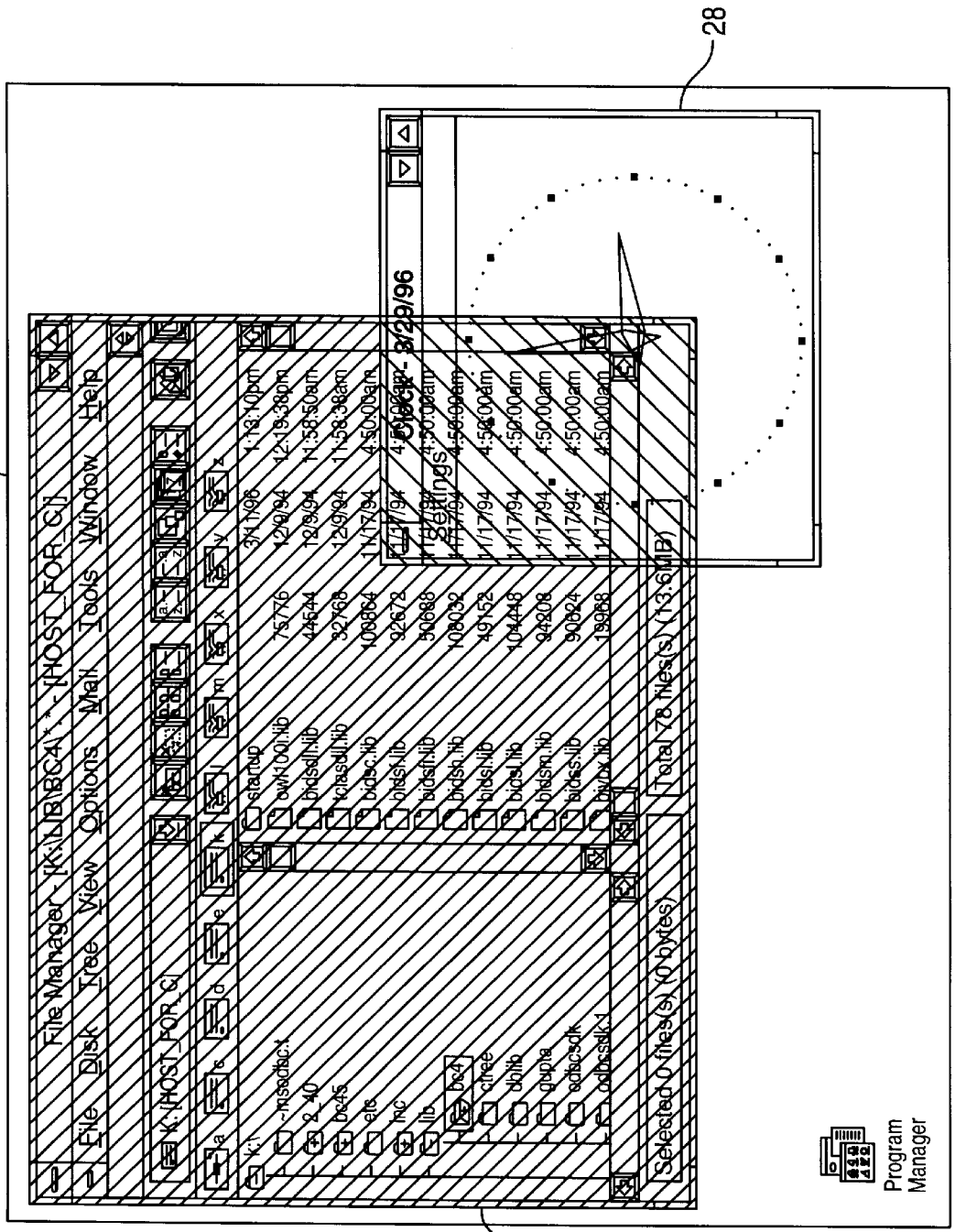
Figure 6C:
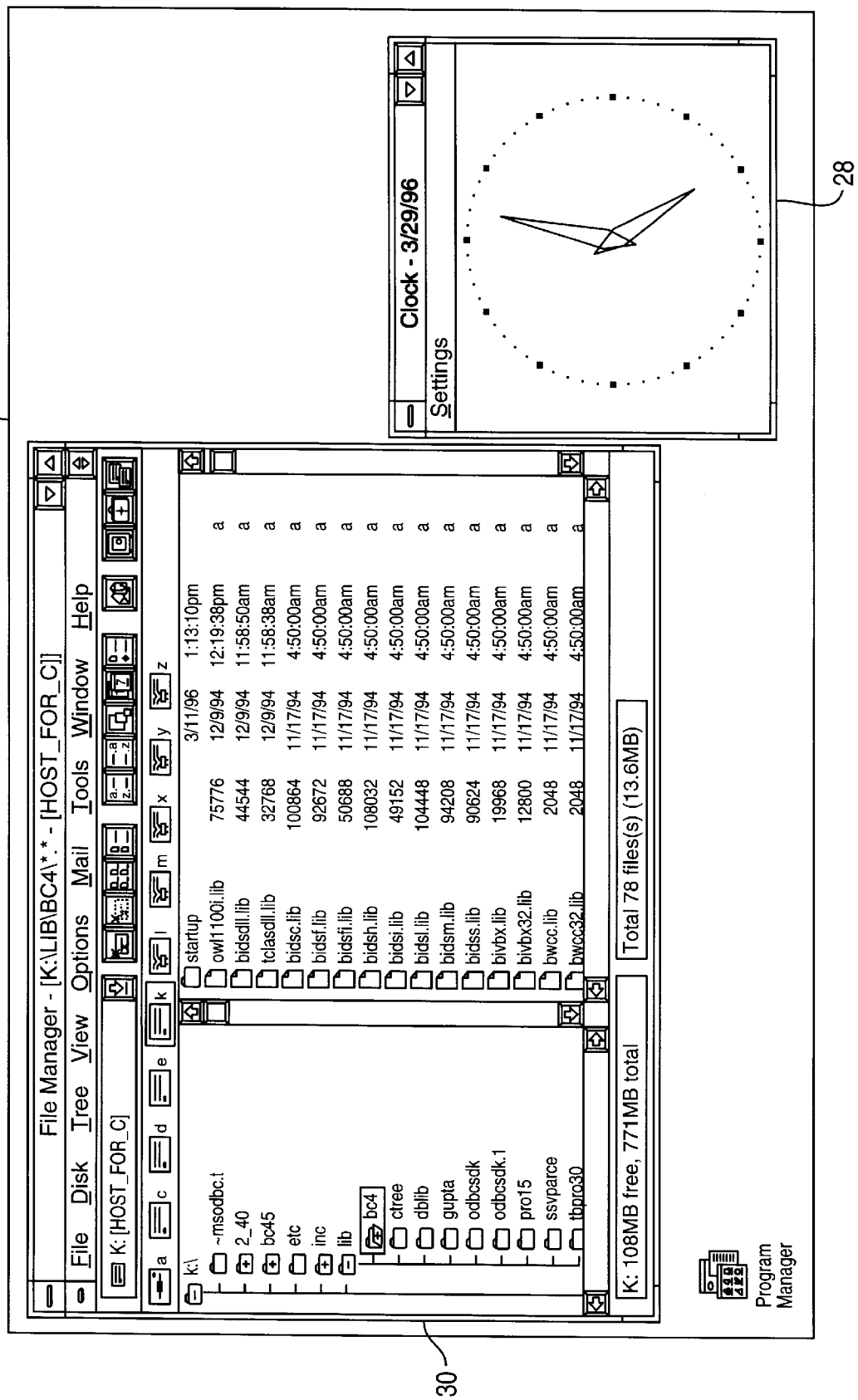

FIGS. 6A through 6C illustrate yet another embodiment of the present invention. The present invention described herein can operate as a complete system which allows each window thereof to be configured as transparent or opaque. As shown in FIG. 6A, window 28 of monitor 12 is configured as a transparent window, allowing window 30 to be viewed therethrough, window 30 being configured as an opaque window.

However, the present invention allows, but is not limited in scope to, for these configurations to be changed. Thus, window 28 can be reconfigured as an opaque window, and window 30 can be reconfigured as a transparent window. After reconfiguration, the windows would be shown as in FIG. 6B, wherein window 30 of monitor 12 allows window 28 to be viewed therethrough.

Finally, the present invention also allows, but is not limited in scope to, the configuration of a window as transparent to automatically be reconfigured as opaque when it does not overlap any other windows. Thus, for example, if window 30 (shown in FIG. 6B) were to be moved such that it is no longer overlapping window 28 (also shown in FIG. 6B), window 30 would automatically be reconfigured as opaque. This situation is shown in FIG. 6C. Window 30 of monitor 12 is opaque because it does not overlap window 28, which is also clearly visible.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for graphically displaying information in one or more windows on a monitor attached to a computer, comprising the steps of:

graphically displaying information in an opaque window on the monitor; and graphically displaying information in a transparent window at least partially overlapping the opaque window on the monitor, wherein the opaque window can be viewed through the transparent window and further comprising the step of darkening the transparent window as compared to the opaque window.

2. The method of claim 1, wherein the transparent window comprises a grid of pixels and overlaps a corresponding grid of pixels of the display, and the step of graphically displaying information in the transparent window comprises the steps of:

determining the corresponding grid of pixels of the display overlapped by the grid of pixels of the transparent window;

copying the corresponding grid of pixels into a buffer;

modifying selected pixels in the buffer as compared to corresponding pixels in the transparent window; and, replacing the corresponding grid of pixels of the display area overlapped by the grid of pixels of the transparent window with the modified grid in the buffer, wherein the modifying step comprises the steps of darkening each pixel in the buffer having a corresponding white pixel in the transparent window, and modifying the color of each colored pixel in the buffer having a corresponding colored pixel in the transparent window.

3. The method of claim 2, each pixel in the buffer and each pixel in the transparent window having an RGB value, wherein the modifying step further comprises the steps of lowering the RGB value of each pixel in the buffer having a corresponding white pixel in the transparent window, and combining the color of each primary colored pixel in the buffer having a corresponding primary colored pixel in the transparent window with the color of the corresponding primary colored pixel in the transparent window.

4. The method of claim 2, wherein the modifying step further comprises the step of dithering the pixels in the buffer surrounding each colored pixel in the buffer having a corresponding colored pixel in the transparent window.

5. The method of claim 1, further comprising the step of re-configuring the transparent window as opaque and the opaque window as transparent.

6. A system for graphically displaying information, comprising:

a computer with a monitor attached thereto, wherein the information is graphically displayed in one or more windows on the monitor;

means, performed by the computer, for graphically displaying information in an opaque window on the monitor; and means, performed by the computer, for graphically displaying information in a transparent window at least partially overlapping the opaque window on the monitor, wherein the opaque window can be viewed through the transparent window and further comprising darkening the transparent window as compared to the opaque window.

7. The system of claim 6, wherein the transparent window comprises a grid of pixels and overlaps a corresponding grid of pixels of the display, and the means for graphically displaying information in the transparent window comprises:

means for determining the corresponding grid of pixels of the display overlapped by the grid of pixels of the transparent window;

means for copying the corresponding grid of pixels into a buffer;

means for modifying selected pixels in the buffer as compared to corresponding pixels in the transparent window; and, means for replacing the corresponding grid of pixels of the display area overlapped by the grid of pixels of the transparent window with the modified grid in the buffer, wherein the means for modifying comprises means for darkening each pixel in the buffer having a corresponding white pixel in the transparent window, and means for modifying the color of each colored pixel in the buffer having a corresponding colored pixel in the transparent window.

8. The system of claim 7, each pixel in the buffer and each pixel in the transparent window having an RGB value, wherein the means for modifying further comprises means for lowering the RGB value of each pixel in the buffer having a corresponding white pixel in the transparent window, and means for combining the color of each primary colored pixel in the buffer having a corresponding primary colored pixel in the transparent window with the color of the corresponding primary colored pixel in the transparent window.

9. The system of claim 7, wherein the means for modifying further comprises means for dithering the pixels in the buffer surrounding each colored pixel in the buffer having a corresponding colored pixel in the transparent window.

10. The system of claim 6, further comprising the means for re-configuring the transparent window as opaque and the opaque window as transparent.

11. A program storage medium readable by a computer having a memory, the medium tangibly embodying one or more programs of instructions executable by the computer to perform method steps for graphically displaying information in one or more windows on a display attached to a computer, the method comprising the steps of:

graphically displaying information in an opaque window on the monitor; and graphically displaying information in a transparent window at least partially overlapping the opaque window on the monitor, wherein the opaque window can be viewed through the transparent window and further comprising darkening the transparent window as compared to the opaque window.

12. The method of claim 11, wherein the transparent window comprises a grid of pixels and overlaps a corresponding grid of pixels of the display, and the step of graphically displaying information in the transparent window comprises the steps of:

determining the corresponding grid of pixels of the display overlapped by the grid of pixels of the transparent window;

copying the corresponding grid of pixels into a buffer;

modifying selected pixels in the buffer as compared to corresponding pixels in the transparent window; and, replacing the corresponding grid of pixels of the display area overlapped by the grid of pixels of the transparent window with the modified grid in the buffer, wherein the modifying step comprises the steps of darkening each pixel in the buffer having a corresponding white pixel in the transparent window, and modifying the color of each colored pixel in the buffer having a corresponding colored pixel in the transparent window.

13. The method of claim 12, each pixel in the buffer and each pixel in the transparent window having an RGB value, wherein the modifying step further comprises the steps of lowering the RGB value of each pixel in the buffer having a corresponding white pixel in the transparent window, and combining the color of each primary colored pixel in the buffer having a corresponding primary colored pixel in the transparent window with the color of the corresponding primary colored pixel in the transparent window.

14. The method of claim 13, wherein the modifying step further comprises the step of dithering the pixels in the buffer surrounding each colored pixel in the buffer having a corresponding colored pixel in the transparent window.

15. The method of claim 11, further comprising the step of re-configuring the transparent window as opaque and the opaque window as transparent.

* * * * *